United States Patent [19]

Tanaka

[11] Patent Number: 4,807,029
[45] Date of Patent: Feb. 21, 1989

[54] METHOD OF RECONSTRUCTING IMAGE FROM COMPRESSION-PROCESSED IMAGE SIGNALS

[75] Inventor: Nobuyuki Tanaka, Kanagawa, Japan
[73] Assignee: Fuji Photo Film Co., Ltd., Kanagawa, Japan
[21] Appl. No.: 62,799
[22] Filed: Jun. 16, 1987
[30] Foreign Application Priority Data
Jun. 16, 1986 [JP] Japan ................................ 61-139720
[51] Int. Cl.$^4$ ............................................. H04N 7/12
[52] U.S. Cl. ................................... 358/133; 358/135; 358/136; 382/56
[58] Field of Search ....................... 358/133, 135, 136; 382/43, 56; 375/122

[56] References Cited

U.S. PATENT DOCUMENTS

| | | | |
|---|---|---|---|
| 3,679,821 | 7/1972 | Schroeder | 358/133 |
| 4,224,678 | 9/1980 | Lynch et al. | 358/133 |
| 4,541,012 | 9/1985 | Tescher | 358/133 |
| 4,633,296 | 12/1986 | Cham et al. | 358/133 |
| 4,691,329 | 9/1987 | Turi et al. | 358/133 |
| 4,698,689 | 10/1987 | Tzou | 358/133 |

Primary Examiner—James J. Groody
Assistant Examiner—John K. Peng
Attorney, Agent, or Firm—Sughrue, Mion, Zinn, Macpeak & Seas

[57] ABSTRACT

In a method of reconstructing an image from compression-processed image signals, the image is reconstructed from transformed image signals obtained by carrying out irreversible compression encoding processing of image signals and then carrying out decoding processing. The irreversible compression encoding processing and the decoding processing of training image signals representing a predetermined training image are carried out to obtain transformed training image signals prior to the image reconstruction. The transformed training image signals are compared with the training image signals, and differences therebetween are calculated at respective picture elements. Noise signals having a signal value distribution in accordance with the distribution of the differences are generated, and the image is reconstructed by randomly adding the noise signals to the transformed image signals.

7 Claims, 3 Drawing Sheets

METHOD OF RECONSTRUCTING IMAGE FROM COMPRESSION-PROCESSED IMAGE SIGNALS

BACKGROUND OF THE INVENTION

1. Field of the Invention

This invention relates to a method of reconstructing an image from compression-processed image signals. This invention particularly relates to a method of reconstructing an image from compression-processed image signals wherein deterioration in the image quality of a reproduced image caused by signal compression is minimized.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of half tone images on optical disks, magnetic disks, or the like has been generally put into practice. In this case, image signal compression is generally conducted for the purpose of efficiently recording image signals on a recording medium.

One of the methods of image signal compression that has been widely applied is an irreversible compression encoding method such as orthogonal transformation or prediction encoding.

With the aforesaid irreversible compression encoding method, image signals can be compressed reliably. However, when such signal compression processing is carried out, there is some loss of image signal. Though the irreversible compression encoding processing is devised so that the image signals that are lost are those that are not so important for image reconstruction, deterioration of the image quality of the reconstructed image is inevitably caused by the loss of the image signal in the case where, for example, the signal compression ratio is increased markedly.

SUMMARY OF THE INVENTION

The primary object of the present invention is to provide a method of reconstructing an image from compression-processed image signals, which minimizes deterioration of the image quality of a reconstructed image caused by loss of image signals.

Another object of the present invention is to provide a method of reconstructing an image from compression-processed image signals, wherein the signal compression ratio is increased substantially while the image quality of the reconstructed image is maintained high.

The present invention provides a method of reconstructing an image from compression-processed image signals in which the image is reconstructed from transformed image signals obtained by carrying out irreversible compression encoding processing of input image signals and then carrying out decoding processing, wherein the improvement comprises the steps of:

(i) carrying out the irreversible compression encoding processing and the decoding processing on training image signals representing a predetermined training image to obtain transformed training image signals prior to image reconstruction, comparing said transformed training image signals with said training image signals, and calculating differences between said transformed training image signals and said training image signals at respective picture elements, (ii) generating noise signals having a signal value distribution in accordance with the distribution of said differences, and (iii) reconstructing said image by randomly adding said noise signals to said transformed image signals.

With the method of reconstructing an image from compression-processed image signals in accordance with the present invention, it is possible to prevent deterioration of the image quality in the reconstructed image caused by loss of image signals arising in the course of the image signal compression. Therefore, it becomes possible to markedly increase the signal compression ratio with the image quality of the reconstructed image maintained high.

DESCRIPTION OF THE PREFERRED EMBODIMENTS

The present invention will hereinbelow be described in further detail with reference to the accompanying drawings.

Figure 1:
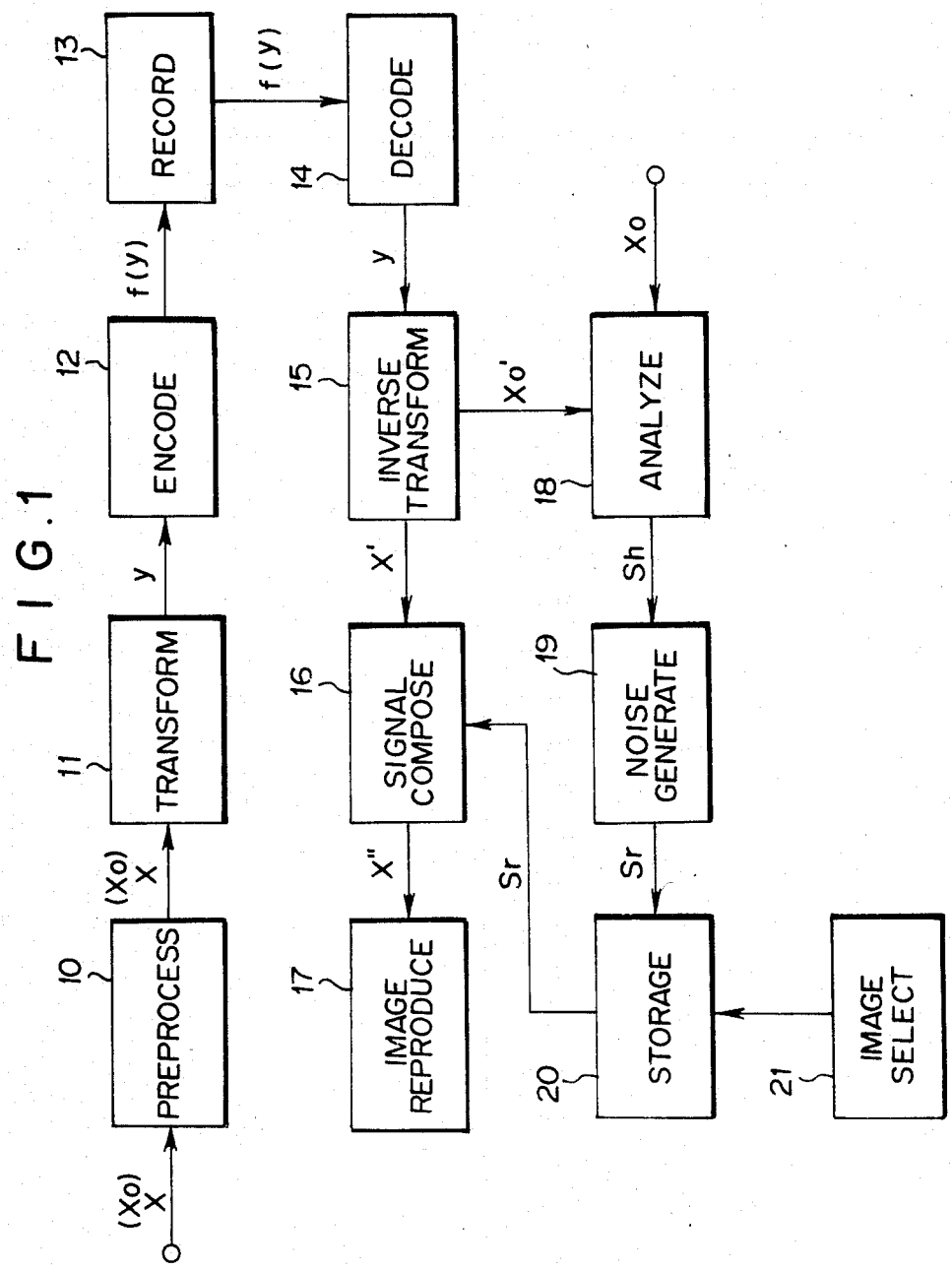
FIG. 1 is a block diagram showing the configuration of an apparatus for carrying out an embodiment of the method of reconstructing an image from compression-processed image signals in accordance with the present invention.
Figure 2:
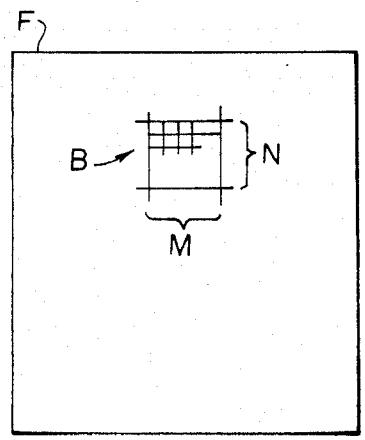
FIGS. 2, 3 and 4 are explanatory views showing the orthogonal transformation in accordance with the present invention.

Referring to FIG. 1, which schematically shows an apparatus for carrying out an embodiment of the method of reconstructing an image from compression-processed image signals in accordance with the present invention, image signals (original image signals) x representing a continuous tone image are first sent to a pre-processing circuit 10 and are subjected therein to pre-processing for improvement of the data compression efficiency, for example, smoothing for noise removal. The pre-processed image signals x are sent to an orthogonal transformation circuit 11 and are subjected therein to two-dimensional orthogonal transformation. For example, as shown in FIG. 2, the two-dimensional orthogonal transformation is conducted in units of rectangular blocks B comprising $M \times N$ samples (picture elements) in a continuous tone image F represented by the image signals x. As the orthogonal transformation, a Hadamard transformation may be used. Since the transformation matrix in a Hadamard transformation is constituted of $+1$ and $-1$ values only, the Hadamard transformation can be executed with a transformation circuit simpler than that needed for other orthogonal transformations. Also, as is well known, a two-dimensional orthogonal transformation can be reduced to one-dimensional orthogonal transformations. Specifically, the two-dimensional orthogonal transformation is carried out by subjecting the image signals of the $M \times N$ block of picture elements in the two-dimensional block B to a one-dimensional orthogonal transformation in the longitudinal direction, and by then subjecting the $M \times N$ block of transformed signals thus obtained to a one-dimensional orthogonal transformation in the transverse direction. The transformation in the longitudinal direction and the transformation in the transverse direction may be conducted in the reverse order.

Figure 3:
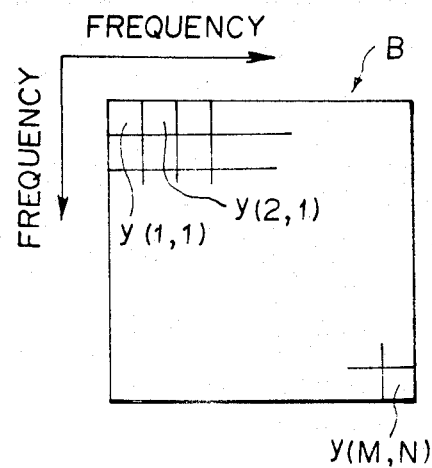

As shown in FIG. 3, transformed signals y obtained by the two-dimensional orthogonal transformation are put side by side in each block B in the longitudinal and transverse directions in the order of the sequency (i.e. the number of "0" position crossings) of the function on which the orthogonal transformation is based (for example, a Walsh function in the case of a Hadamard transformation, or a trigonometrical function in the case of a Fourier transformation). Since the sequency corresponds to the spatial frequency, the transformed signals y are arranged in the order of the spatial frequency, i.e. in the order of the density of the detailed components of the image, in the longitudinal and transverse directions in the block B. In FIG. 3, a transformed signal y(1,1) at the top line of the left end column corresponds to sequency 0 (zero). As is well known, the transformed signal y(1,1) represents the average image density in the block B.

Figure 4:
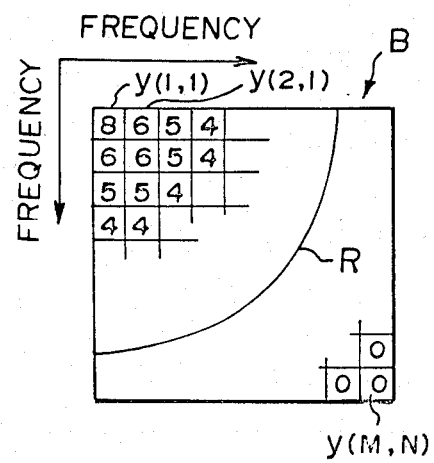

The transformed signals y arranged in the order of the sequency of the function on which the two-dimensional orthogonal transformation is based are sent to an encoding circuit 12 as shown in FIG. 1. The encoding circuit 12 encodes each of the transformed signals y in the block B with a length code (i.e. a number of bits) in accordance with a predetermined bit allocation table. In the bit allocation table, an intrinsic number of bits is allocated for each sequency, for example, as shown in FIG. 4. Since energy is concentrated in the low frequency component in the transformed signals y, it is possible to decrease the number of bits required per block B and achieve image signal compression by allocating a comparatively long length code to low frequency components having high energy, and allocating a comparatively short length code to high frequency components having low energy.

In the aforesaid encoding circuit 12, as shown in FIG. 4, a null bit is allocated to those transformed signals y outward of a predetermined arc R of a circle having its center at the transformed signal y(1,1) of sequency 0 (zero), to thereby discard such transformed signals y. The respective transformed signals y along the arc R carry frequency components nearly equal to each other. Therefore, as a result of the aforesaid operation, all of the transformed signals y representing very high frequency components above a predetermined frequency (such transformed signals y being not so important in the expression of the original image F) are discarded, and the signal compression effects are improved markedly. Such an operation is referred to as zonal sampling.

As shown in FIG. 1, the image signals f(y) encoded as mentioned above are recorded on a recording medium (image file) such as an optical disk or a magnetic disk in a recording and reproducing apparatus 13. Since the image signals f(y) have been markedly compressed as compared with the original image signals x, a large number of images can be recorded on the recording medium. When the image is to be reproduced, the image signals f(y) are read out from the recording medium, and are decoded into the transformed signals y in a decoding circuit 14. The transformed signals y thus decoded are sent to an inverse transformation circuit 15 and transformed inversely to the aforesaid two-dimensional orthogonal transformation. Image signals x' are restored in this manner. The transformed image signals x' are sent to an image reproducing apparatus 17 via a signal composing circuit 16 as will be described later, and used for reproduction of the image which the image signals x' represent.

In a strict sense, the transformed image signals x' obtained by the inverse transformation are not identical with the original image signals x fed to the pre-processing circuit 10. This is because the high frequency components thereof are lost in the course of processing such as the aforesaid smoothing carried out by the pre-processing circuit 10 and the aforesaid zonal sampling carried out by the encoding circuit 12. Therefore, if an image is reproduced by directly using the transformed image signals x', the image quality of the reproduced image will be inferior to the image quality of the original image. The technique of eliminating this problem in accordance with the present invention will be described hereinbelow.

Figure 5:
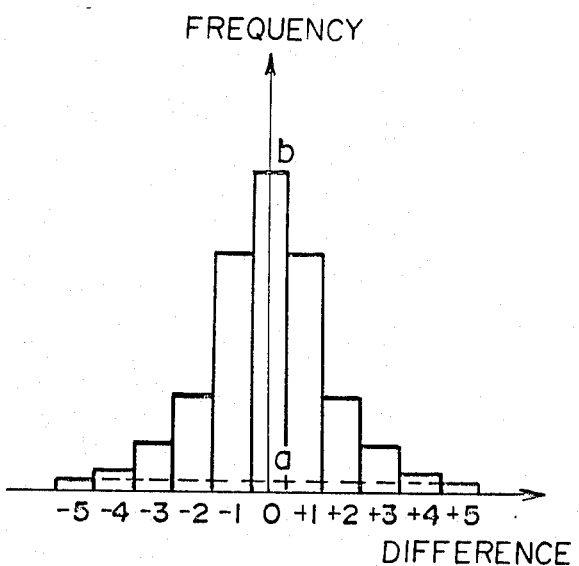
FIG. 5 is an explanatory graph showing the method of reconstructing an image from compression-processed image signals in accordance with the present invention.

First, before image reconstruction is carried out following the aforesaid image signal compression, training image signals xo representing a standard training image are fed to the pre-processing circuit 10. As shown in FIG. 1, the training image signals xo are subjected to orthogonal transformation by the orthogonal transformation circuit 11, encoding by the encoding circuit 12, recording and reproduction by the recording and reproducing apparatus 13, decoding by the decoding circuit 14, and inverse transformation by the inverse transformation circuit 15. These processing steps are carried out in the same manner as described above. The transformed training image signals xo' generated by the inverse transformation circuit 15 in this manner are different from the training image signals xo fed to the pre-processing circuit 10. The transformed training image signals xo' are fed to an analysis section 18. The analysis section 18 also receives the training image signals xo, compares the training image signals xo with the transformed training image signals xo', and calculates the differences therebetween at the respective picture elements. The differences are obtained by calculating by how many levels the number of the quantization levels of the transformed training image signals xo' are larger (plus) or smaller (minus) than the number of the quantization levels of the training image signals xo. For example, the distribution of the differences calculated in this manner at the respective picture elements becomes as shown in FIG. 5. The analysis section 18 sends signals Sh representing the distribution of the differences calculated in this manner to a random noise generating section 19 which generates random noise signals Sr having a distribution in accordance with the distribution of the differences which the signals Sh represent. Specifically, in the case where the distribution of the differences is as shown in FIG. 5, the random noise signals Sr are formed to include "a" number of components of a +5 level, ...., "b" number of components of a +0 level, ..., and "a" number of components of a −5 level. The random noise signals Sr having such a distribution are stored in a storage means 20 with the respective components arranged at random.

Several types of random noise signals Sr are created based on training image signals xo representing different training images, and are stored in the storage means 20. For example, the types of the random noise signals Sr are classified into radiation images and an ordinary photographic images. The radiation image may further be subdivided into, for example, a stomach image, a mammary image and other images, and the ordinary photographic image may be subdivided into, for example, a portrait image, a landscape image and other images.

In the course of reproducing an image by sending the transformed image signals x' generated by the inverse transformation circuit 15 to the image reproducing apparatus 17 as mentioned above, the aforesaid random noise signals Sr are added to the transformed image signals x' in the signal composing circuit 16. At this time, since the respective components of the random noise signals Sr are arranged at random as mentioned above, the respective components are added randomly with respect to the transformed image signals x'. In reading random noise signals Sr from the storage means 20 for sending to the signal composing circuit 16, those random noise signals Sr obtained based on a training image of the same type as the image which the image signals x represent are selected and read from the storage means 20. The selection is effected by, for example, manual designation of the image type at an image selecting section 21. Since the random noise signals Sr are added to the transformed image signals x' in the manner as mentioned above, a loss of high frequency components caused by encoding by orthogonal transformation is compensated for, and image signals x" thus obtained by signal composition become akin to the original image signals x as a whole. Therefore, when an image is reproduced by use of the image signals x" obtained by the signal composition with the random noise signals Sr, the reproduced image has a high image quality free from the adverse effects of loss of image signals.

In the aforesaid embodiment, random noise signals Sr having the same distribution as the distribution of the differences between the transformed training image signals xo' and trining image signals xo are added to the transformed image signals x'. However, random noise signals Sr having 0 a distribution α times the distribution of the aforesaid differences, where α is a constant satisfying the condition of $0<\alpha<1$, may instead be added to the transformed image signals x'.

Though the aforesaid embodiment is applied to the case where the image signals are compressed by encoding by orthogonal transformation, the method of reconstructing an image from compression-processed image signals in accordance with the present invention is applicable also to the case where the image signals are compressed by other irreversible compression encoding methods such as prediction encoding.

I claim:

1. A method of reconstructing an image from compression-processed image signals, in which an image signal presented for reconstruction is comprised of transform image signals obtained by carrying out irreversible compression encoding processing of input image signals, and then carrying out decoding processing.

wherein the improvement comprises the steps of:
   (i) carrying out said irreversible compression encoding processing and said decoding processing on input training image signals representing a predetermined training image, to obtain transformed training image signals prior to image reconstruction, comparing said transformed training image signals with said input training image signals, and calculating differences between said transformed training image signals and said input training image signals at respective picture elements,
   (ii) generating noise signals having a signal value distribution in accordance with the distribution of said differences, and
   (iii) reconstructing said input image by randomly adding said noise signals to said transform image signals.

2. A method as defined in claim 1 wherein an image of the same type as said image which is to be reconstructed is used as said training image.

3. A method as defined in claim 1 wherein said irreversible compression encoding processing is encoding by orthogonal transformation.

4. A method as defined in claim 1, further comprising the step of reproducing said reconstructed input image.

5. A method as defined in claim 1, wherein said irreversible compression encoding processing comprises the steps of orthogonally transforming an input image signal according to a Hadamard transform, and performing zonal sampling processing on said orthogonally transformed signal, to discard components above a predetermined high frequency.

6. A method as defined in claim 1, further comprising the step of selecting said training image from a plurality of stored training images in accordance with the attributes of the input image.

7. A method as defined in claim 1, wherein said calculating step comprises the step of determining the number of quantization levels by which picture elements of said input training image signals are smaller or larger than that of said transformed training image signal.

* * * * *